Aug. 21, 1962 J. H. BANKS 3,050,039
APPARATUS FOR MAKING FIBROUS GLASS MATS
Filed Nov. 23, 1959 5 Sheets-Sheet 1

INVENTOR.
JOHN H. BANKS
BY
Teare, Kramer, Sturges & Felzer
ATTORNEYS

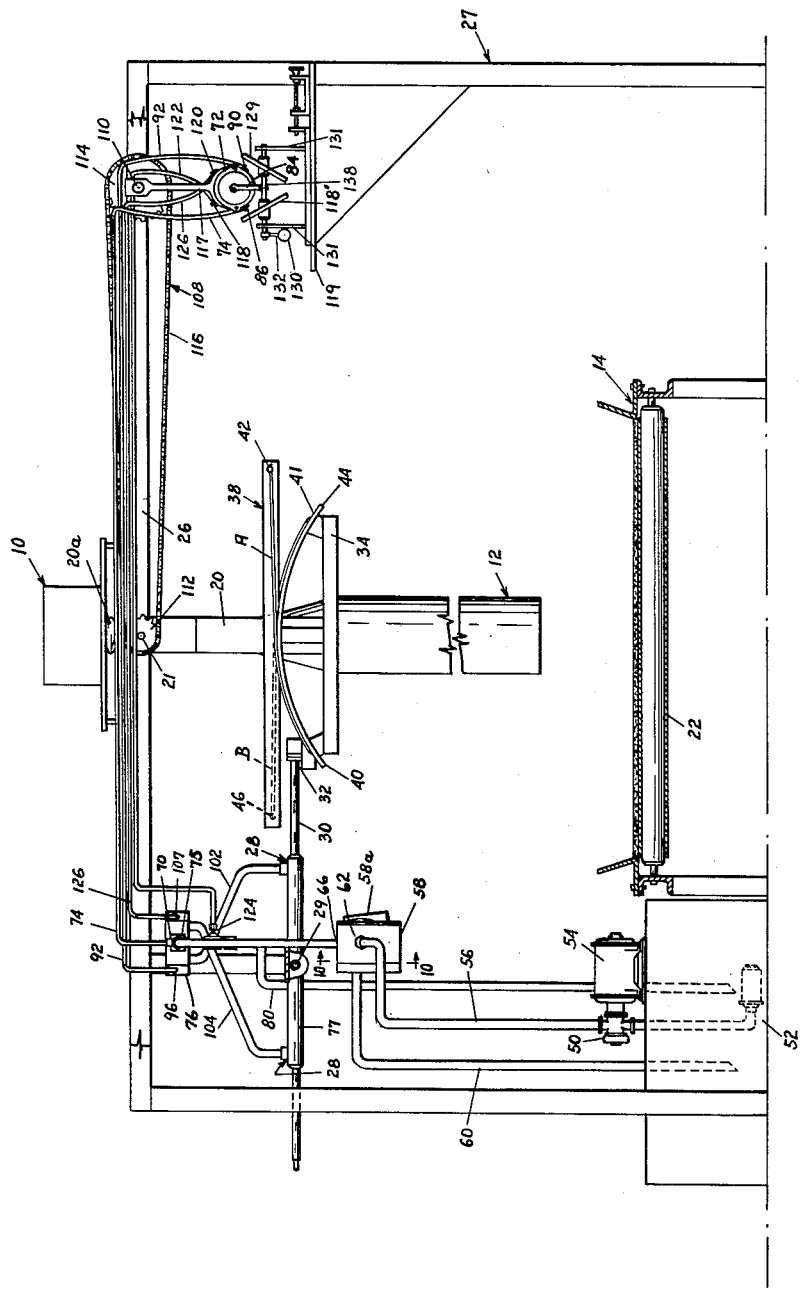

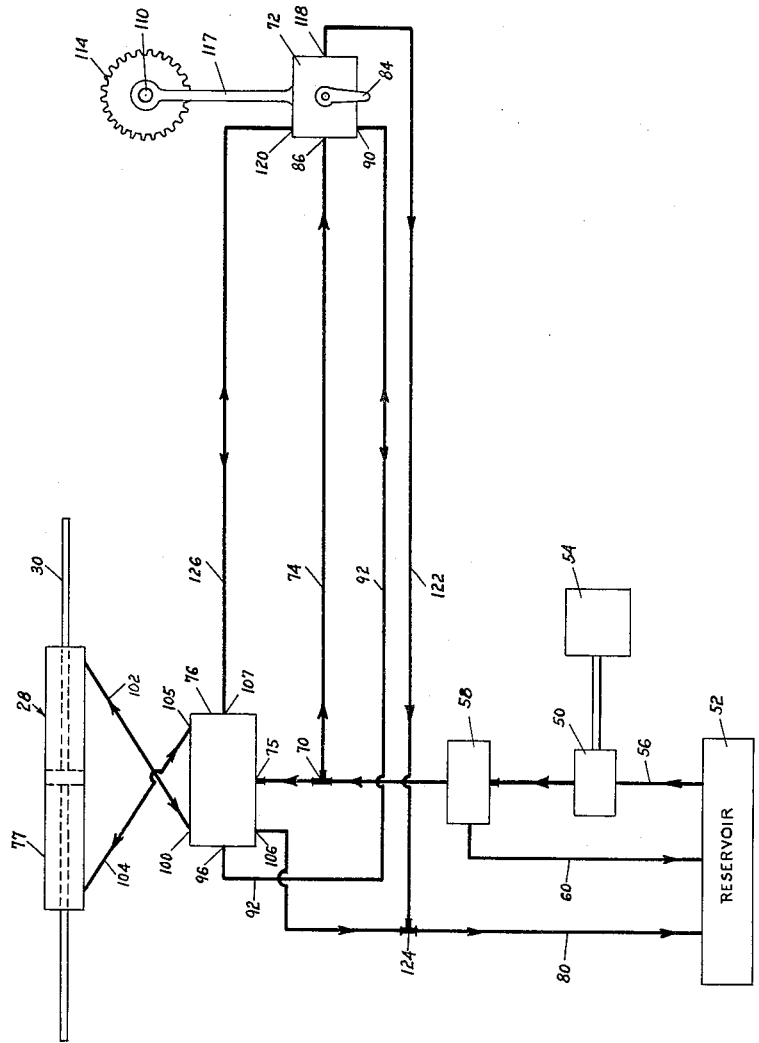

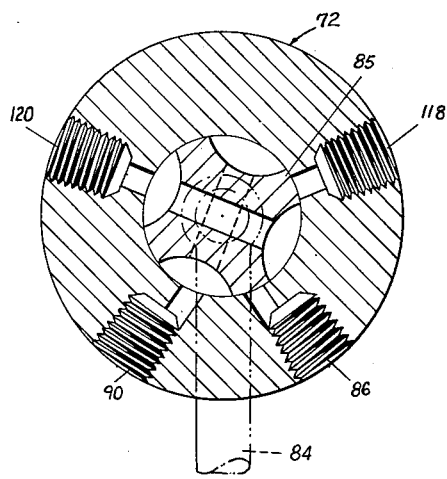
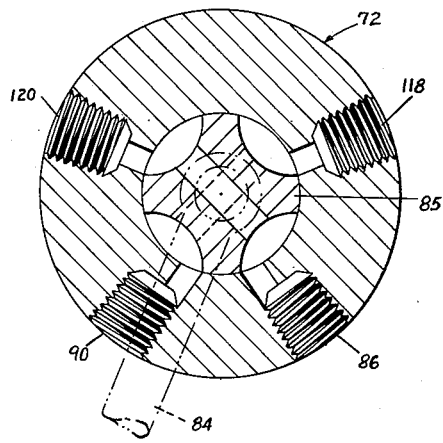
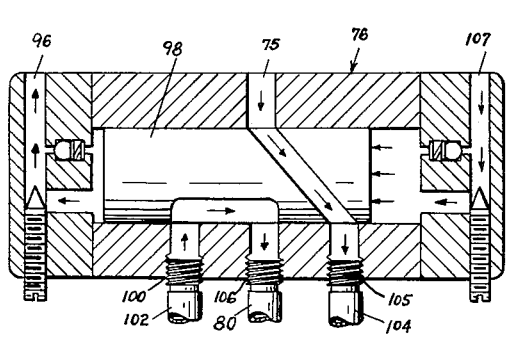
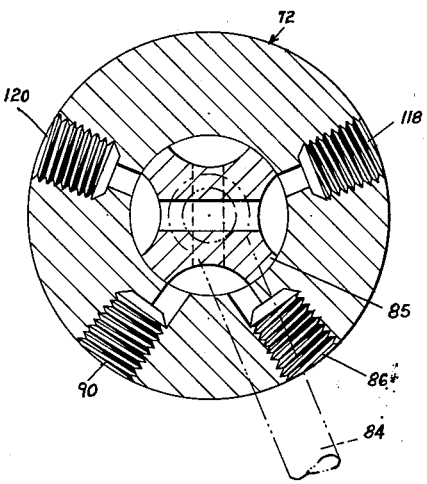
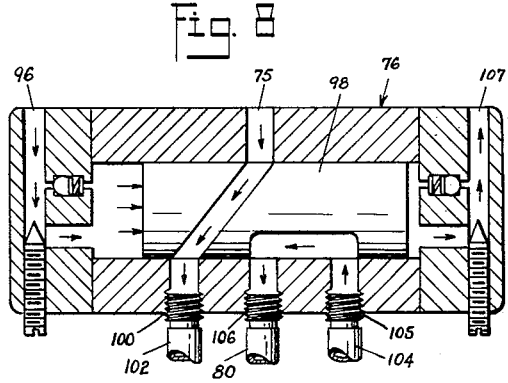
INVENTOR.
JOHN H. BANKS

Aug. 21, 1962 J. H. BANKS 3,050,039
APPARATUS FOR MAKING FIBROUS GLASS MATS
Filed Nov. 23, 1959 5 Sheets-Sheet 5

INVENTOR.
JOHN H. BANKS
BY
Teare, Kramer, Sturges & Felzer
ATTORNEYS

United States Patent Office 3,050,039
Patented Aug. 21, 1962

3,050,039
APPARATUS FOR MAKING FIBROUS GLASS MATS
John H. Banks, Nashville, Tenn., assignor to The Ferro Corporation, Cleveland, Ohio, a corporation of Ohio
Filed Nov. 23, 1959, Ser. No. 854,899
5 Claims. (Cl. 121—159)

This invention relates in general to an apparatus for producing mats of glass fibers, and more particularly is concerned with improvements in the apparatus for controlling the operation thereof and thus producing a more uniform and desirable fibrous mat.

Apparatus for producing fibrous mats are known in the art and conventionally include a generally downwardly extending, power driven, laterally reciprocating lay-down chute for receiving chopped glass fibers and depositing the latter on an underlying longitudinally extending, continuously moving conveyor, to form a continuous glass fiber mat of predetermined thickness and density. Heretofore, however, such prior art mechanisms were not able to be optimumly controlled, which resulted in the production of fibrous mats which did not at all times meet variable operating conditions and critical specifications, especially as concerns uniformity of mat structure. It has been determined that in order to provide for optimum performance of such a reciprocating lay-down chute, the reciprocating drive and control system for the chute should incorporate the following characteristics.

(1) The fibers discharged from the chute should meet the conveyor belt in a pattern which moved laterally across the belt at a uniform speed regardless of the angular position of the chute.

(2) The change of direction of angular motion which takes place at the end of each stroke of the chute should be accompanied by as little shock as possible due to lost motion or back lash.

(3) The speed of transverse, or number of strokes per minute, of the chute should be adjustable while the chute is in motion.

(4) The width of stroke across the conveyor belt should be adjustable while the chute is in motion.

(5) The center of the traversing path across the conveyor belt should be adjustable while the lay-down chute is in motion.

The present invention provides a fluid powered drive and control system particularly adapted for reciprocating the lay-down chute of a fibrous glass mat producing apparatus and which may provide the above desirable characteristics. The present invention also provides an improved glass fiber mat producing apparatus including a reciprocating type lay-down chute and embodying a novel fluid powered and controlled drive system for reciprocating the lay-down chute, and one which may possess all or some of the above mentioned desirable characteristics.

Accordingly, an object of the invention is to provide an improved fluid powered apparatus for depositing glass fibers to form mats of improved and uniform thickness and density.

Another object of the invention is to provide an arrangement of the latter type wherein a reciprocating lay-down chute is actuated and controlled by a novel fluid powered drive and control system.

A further object of the invention is to provide an apparatus of the above type wherein the reciprocating speed of the lay-down chute will be uniform regardless of the angular position of the chute, wherein the change of direction taking place at the end of each stroke of the reciprocating chute will be accompanied by as little back-lash as possible, wherein the speed or number of strokes per unit of time of the chute shall be adjustable while the latter is in motion, wherein the width of stroke across an underlying conveyor belt shall be adjustable while the chute is in motion, and wherein the center of the traversing path of the chute across the conveyor belt shall be adjustable while the chute is in motion.

A still further object of the invention is to provide a novel fluid powered reciprocating drive and control system and one which may be advantageously used with apparatus utilized to deposit glass fibers in the formation of improved fiber glass mats.

Other objects and advantages of the invention will be apparent from the following description taken in conjunction with the accompanying drawings wherein:

FIG. 2 is a more or less diagrammatic front elevational view of the apparatus illustrated in FIG. 1 but also illustrating the fluid pressure drive and control system for the apparatus.

FIG. 3 is a schematic illustration of the fluid pressure drive and control system of the invention, illustrating with arrow heads the preferred direction of flow of fluid pressure in the distributing lines of the system and in accordanec with the invention.

Figure 4:
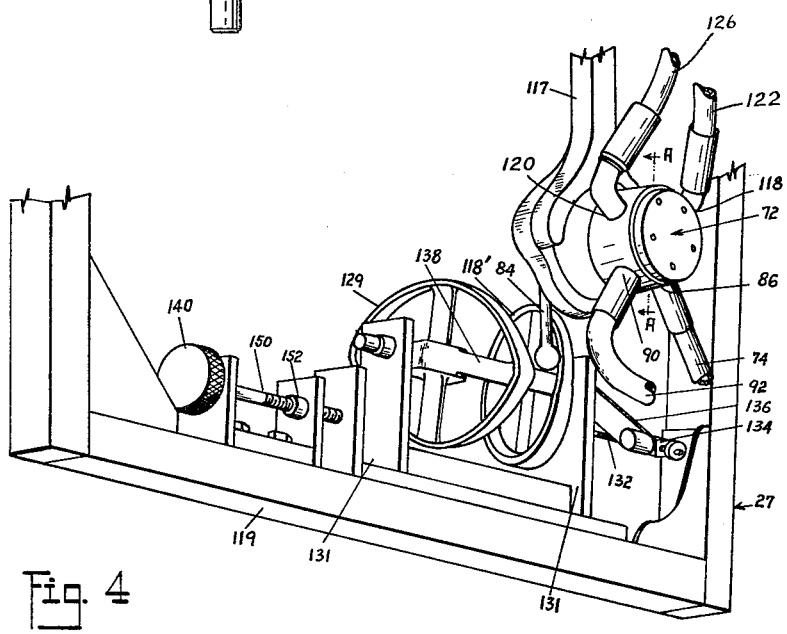
FIG. 4 is an enlarged perspective view of the pilot valve and associated cam and positioning mechanism therefor, of the fluid powered drive and control system, and is taken substantially from the rear of such apparatus from that of the view illustrated in FIG. 2.

FIG. 5 is an enlarged vertical sectional, generally diagrammatic view of the latter mentioned pilot valve of the control system with the actuating handle thereof having been moved in a direction to connect the pressure inlet port of the valve to one of the distributing ports thereof, and connect the other distributing port to the reservoir bank return port of the valve. FIG. 5 is taken substantially along the plane of line A—A of FIG. 4 looking in the direction of the arrows.

FIG. 6 is a view similar to FIG. 5, but wherein the operating handle of the pilot valve has been moved to reverse the connections of the ports from the condition illustrated in FIG. 5.

FIG. 7 is a view similar to FIGS. 5 and 6 but wherein the control lever of the valve is in central position so that all connections to the valve are blocked. This is the cross-over or neutral position of the pilot control valve.

FIG. 8 is an enlarged diagrammatic sectional view of the directional control valve of the stem illustrating diagrammatically the flow of fluid therethrough and its operation in the position of the pilot valve as shown in FIG. 5.

FIG. 9 is a view similar to FIG. 8 but showing diagrammatically the flow of fluid therethrough when the control lever of the pilot valve has been reversed to the position illustrated in FIG. 6.

Figure 10:
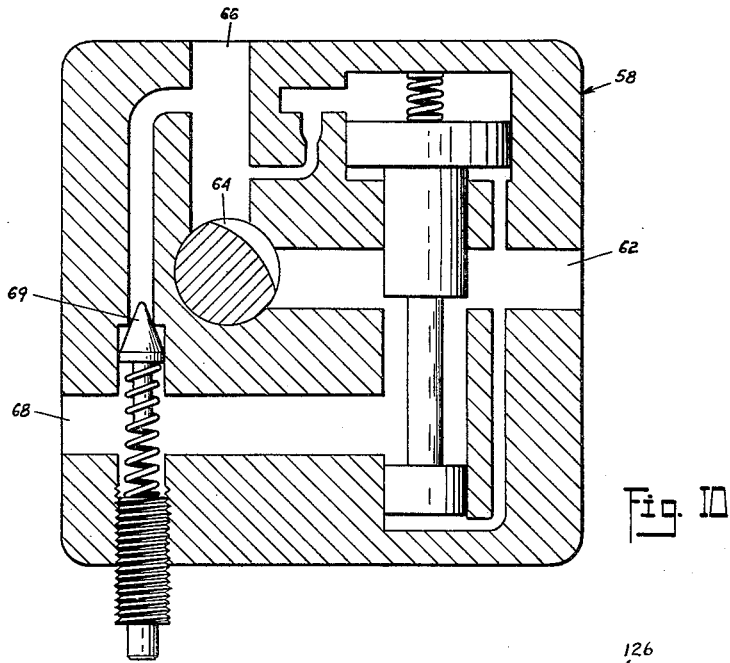

FIG. 10 is an enlarged more or less diagrammatic, vertical sectional view, taken generally along the plane of line 10—10 of FIG. 2, looking in the direction of the arrows, and illustrating in detail the flow control valve of the control system.

Figure 1:
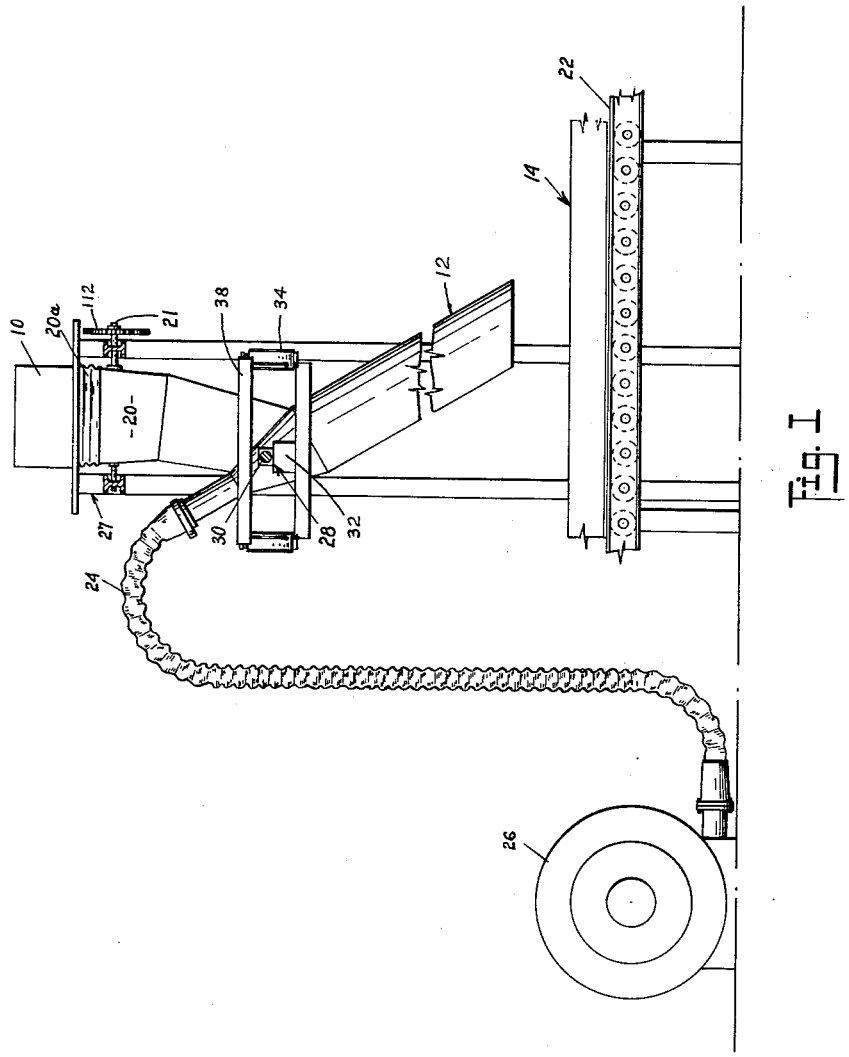
FIG. 1 is a more or less diagrammatic side elevational view of a glass fiber mat producing apparatus in accordance with the invention but with the greater portion of the fluid powered control system having been eliminated in the interests of clarity.

Referring now again to the drawings and more especially to FIGS. 1 and 2 thereof, the apparatus herein illustrated comprises a chopper device 10 of any conventional well known type mounted above and communicating with a laterally swingable lay-down chute 12 which deposits the chopped fibers on an underlying longitudinally movable conveyor 14 to form a continuous fibrous mat of predetermined width and thickness and comprised of a vertical overlapping curtain of the fibrous material.

As previously indicated, the mat-producing apparatus illustrated is particularly adapted for utilization of fibrous glass which is available in the form of rovings, cake package strands or other suitable forms of continuous strands. The continuous strands are chopped by chopper mechanism 10 into short lengths and then gravity fed into lay-down chute 12. The chopping device has not been illustrated here in detail since it forms no particularly novel part of the present invention and such chopping devices, such as hammermills and the like, are well known.

The chopped strands enter the lay-down chute 12 through duct portion 20 which is coupled to chopper 10 as by means of flexible conduit 20a. The lay-down chute is positioned under the chopping device 10 and pivotally suspended as on horizontal axis 21 for oscillating or swinging movement in a direction transverse of the underlying longitudinally movable belt 22 of the conveyor. At the rear of the lay-down chute 12, an air inlet tube 24 is provided, tube 24 being flexible and connected to a blower 26, and thus providing an aeroform stream in chute 12 for entraining the chopped fibers from cutter 10 therein, and depositing the fibers in generally compact and overlapping condition on the upper surface of the preferably foraminous conveyor belt 22.

Oscillation of lay-down chute 12 with respect to its supporting structure 27 and about its pivotal mounting 21 to such support structure is accomplished by means of a double acting, fluid-powered piston and cylinder unit 28 which forms a component part of the drive and control system of this invention. The operation of motor unit 28 and its connection in the drive and control system will be hereinafter described in detail. The cylinder of motor unit 28 is pivoted as at 29 to support structure and the piston rod 30 of motor unit 28 is connected as at 32 to a rocker frame mechanism 34 which in turn is preferably flexibly supported by follower frame structure 38.

The follower frame 38 is attached or secured to the lay-down chute 12 generally directly above the rocker mechanism 34, and a support connection between the latter mechanism and the follower frame 38 is accomplished by means of flexible cable elements A and B, on both the front and rear sides of duct portion 20 of the lay-down chute. Each cable A is connected as at 40 to one end of the rocker mechanism 34, is entrained over the respective arcuate shaped rocker portion 41 and then at the other end, as at 42, is connected in relatively taut relation to the associated end of the follower frame 38, while cable B is connected at one end, as at 44, to the opposite end of rocker mechanism 34, and then extends upwardly over rocker portion 41 in relatively taut relationship to be connected as at 46 to the other end of follower frame 38. Thus it will be seen that upon swinging movement of rocker frame 34 transversely of conveyor 14 due to reciprocation of motor unit 28, the lay-down chute 12 is caused to swing or pivot about its pivotal axis 21 due to cables A and B. Thus lay-down chute 12 indirectly supports and is relatively flexibly connected to rocker mechanism 34 which in turn is actuated by the aforementioned reciprocal motor unit 28.

The drive and control arrangement for the lay-down chute will now be described.

Power in the form of fluid, such as oil under pressure, is supplied by a motor driven constant delivery pump 50 from a reservoir 52 of such fluid, pump 50 being driven in the embodiment illustrated by electrical motor 54. From pump 50, the pressurized fluid is fed via feed line 56 to a combination relief and flow control valve 58. Valve 58 is of conventional well known type comprising a slotted plug manually actuated by a control dial 58a (FIG. 2) for selectively controlling the volume of pressurized fluid through the valve. Any surplus pressurized fluid above the regulated flow or regulated pressure is returned to tank or reservoir 52 via line 60. A more or less diagrammatic illustration of this valve 58 is shown in FIG. 10 of the drawings, reference number 62 being the pressure inlet port of the valve, reference number 64 being the slotted control plug to which the external control dial 58a is attached, reference number 66 being the metered flow outlet port of the valve, and reference number 68 being the outlet port back to the tank 52 via line 60. Conventional adjustable overload relief valve mechanism 69 is provided for limiting maximum operating pressure.

Accordingly, fluid at pre-set pressure and flow rate is delivered to T connection 70 from valve 58, where at connection 70 part of such flow is diverted to a pressure connection port of pilot valve 72 via feed line 74, with the remainder of the flow being directed to pressure port 75 of a directional control valve 76 (FIG. 3), the latter controlling the fluid pressure flow simultaneously to one end and from the opposite end of the operating cylinder 77 of motor unit 28, such flow from the opposite end of cylinder 77 then being fed back to the directional control valve 76 from whence it is fed via drain line 80 back to the reservoir 52, as will be hereinafter described in greater detail.

Pilot valve 72 which controls the actuation of directional control valve 76, therefore ultimately controls the direction of reciprocation or motion of the piston rod 30 of motor unit 28. Pilot valve 72 is a four-way valve of conventional well known type having a relatively small capacity, and is optimumly suitable for remote control of directional valve 76 in the instant system. The valve 72 is of the closed center type which therefore blocks the fluid flow between the pressure, the reservoir tank and the directional control valve connections during valve spool cross-over, and thus pressure is maintained in the system.

Referring now to FIGS. 3, 4, 5, 6 and 7 of the drawings, there is more or less diagrammatically illustrated the flow of fluid pressure through the pilot control valve 72 during various operating conditions and positions of its control lever 84 and associated valve spool 85. Assuming for purposes of illustration that the valve operating lever 84 is to right of center, as shown in FIG. 5 of the drawings (which would be to left of center as viewed in FIG. 2 of the drawings) and that the pump 50 is operating, fluid will be directed from T connection 70 via line 74 to the pressure inlet port 86 (FIGS. 2, 3 and 5) of pilot valve 72, and through the rotary plug or spool 85 of the valve to distributor port 90. From port 90 the pressure is fed via feed line 92 to pressure port 96 of the directional control valve 76.

Directional control valve 76 is of conventional well known type and as diagrammatically illustrated in FIGS. 8 and 9 of the drawings comprises a spool 98 internally of the valve casing which takes up a position in response to the flow of pressurized fluid from pilot valve 72, such positioning of the spool controlling the flow of pressurized fluid to and from motor unit 28. When pressure is fed into aforementioned port 96 of directional control valve 76, the spool 98 is shifted to the right as shown in FIG. 8 of the drawings, and thus the pressurized fluid from T construction 70 flowing into the pressure port 75 of the directional control valve 76 will flow via port 75 through the control valve, as diagrammatically illustrated in FIG. 8, to port 100 and thence via line 102 to the right hand side (as viewed in FIGS. 2 and 3) of the cylinder of motor unit 28, and will drain fluid via feed line 104 and from the left hand side of motor unit 28 (as viewed in FIG. 2) back to port 105 of the directional control valve 76, from whence it flows to discharge port 106 to aforementioned discharge line 80 and then back to the supply reservoir 52. Accordingly in conjunction with the above, the piston and piston rod 30 will move to the left (as viewed in FIG. 2) moving rocker assembly mechanism 34 therewith, and motion is transmitted from the cylinder connected rocker assembly 34 to the chute mounted follower frame 38 via the aforementioned cables A and B, and therefor pivoting of the discharge or lay-down chute 12 to the left occurs, as viewed in FIG. 2. As diagrammatically illustrated in FIG. 8, movement of plunger 98 of distributing valve 76 to the right forces any valve actuating fluid in the right hand side of the plunger chamber through pressure port 107, line 126, through port 120 to port 118 of pilot valve 72 (FIG. 5) and thence via line 122 to T connection 124, to drain line 80 and then to reservoir 52.

Simultaneously with the pivoting of chute 12, motion is transmitted through chain and sprocket timing drive 108 to a rotary shaft 110 (FIG. 2) on which the pilot valve assembly 72 is mounted. Chain and sprocket drive 108 comprises a sprocket 112 secured to the laydown chute 12 and a sprocket 114 secured to shaft 110 together with the drive chain 116 entrained around both sprockets. Thus it will be seen that as chute 12 commences to swing or pivot to the left (as viewed in FIG. 2) in accordance with the movement of the piston rod 30 of the motor unit 28 to the left as aforedescribed, the pilot valve assembly including the arm member 117 which depends from and is secured to rotatable shaft 110, is caused to swing also to the left (as viewed in FIG. 2). The motion of the arm 117 and attached pilot valve assembly 72 is diminished by suitable sprocket ratios in order to minimize the wear and tear on the connecting hoses of the valve 72 to the directional control valve 76.

The supporting arm 117 and supported pilot valve 72 continues to move to the left, or swing to the left, until the operating lever 84 engages the respective cam member 118' mounted on shelf portion 119, whereupon lever 84 is pushed or moved to the right as viewed in FIG. 2 of its center position, such center position being illustrated in FIG. 7 and as aforementioned being such that the flow of pressurized fluid is completely blocked through the pilot valve, until the control lever 84 of the pilot valve is to right of center position, or in other words the position illustrated in FIG. 6 of the drawings. It will be understood of course that since FIG. 6 is a view looking out of the plane of the paper of FIG. 2, the control lever in FIG. 6 is shown to left of center, which corresponds to being to right of center in the FIG. 2 illustration. In such position the pressure inlet port 86 of valve 72 is connected by the rotary valve spool 85 to distributor port 120 while said aforementioned port 90 and associated line 92 are connected by the valve spool and via port 118 and line 122 to T connection 124 and drain line 80 and thence back to the reservoir tank 52.

Accordingly, fluid pressure through the pilot control valve 72 is fed via port 120 and via lines 126 to the right hand end as viewed in FIG. 2 of the directional control valve 76, and to port 107 in such directional control valve. The valve spool 98 of the directional control valve is thus caused to shift to the left, as illustrated in FIG. 9 of the drawings, thereby causing the fluid pressure being fed from the flow control valve 58 to the pressure port 75 of the directional control valve 76, to be fed to the left hand side (as viewed in FIGS. 2 and 3) of the cylinder of motor unit 28, while draining the fluid in the right hand side of the cylinder via line 102 and port 100 in the directional control valve, back to the discharge port 106 and associated discharge line 80 and thence back to the reservoir 52. It will be seen as diagrammatically illustrated in FIG. 9 that the fluid in the left hand side of the plunger chamber of the directional control valve is forced back via port 96 and line 92 to port 90 and thence back through port 118, then via line 122 to discharge line 80, and thence back to the reservoir. Accordingly, the piston rod of motor unit 28 will be shifted to the right (as viewed in FIG. 2) causing swinging movement of the discharge chute 18 to the right (as viewed in FIG. 2) to therefore repeat the above described cycle of operation. It will be understood that upon swinging of the arm 117 and attached pilot valve 72 to the right (as viewed in FIG. 2), the control lever 84 of the pilot valve 72 will engage cam member 129 to move such lever left of center (as viewed in FIG. 2) to automatically again repeat the reciprocating cycle.

The speed or cycles per minute of the discharge chute in its oscillating transverse movement with respect to the conveyor 14 is readily controlled by the flow control adjustment dial 58a of the control valve 58.

In accordance with the invention, means is provided for adjusting the stroke or degree of pivoting of the lay-down chute, to thereby provide for different widths of mats produced on the apparatus. Such means, in the embodiment illustrated, comprises a rotary handle 130 supported by bracket structure 131, and which operates a rotatable threaded shaft 132 which coacts with a threaded nut 134 mounted on a lever 136 which in turn is secured to a rotatable shaft 138 on which the cam members 118', 129 are fixed for rotation therewith. Upon turning of handle 130 and resultant rotation of shaft 132, nut 134 is caused to move axially with respect to shaft 132 thereby pivoting lever 136 and rotating cam shaft 138. Rotation of shaft 138 causes associated rotation of cams 118', 129, and as the latter rotate, the distance between the contact points in the path of the pilot valve lever 84 is changed, and with it the length of stroke of motor unit 28 before reversal. It will be seen therefore, that with such an arrangement, the width of the stroke of the discharge chute across the belt will be adjustable, and while the chute is in motion.

The means for adjusting the center of the traversing path of the discharge chute 12 across the conveyor belt is provided by an arrangement comprising a knurled knob 140 operating a threaded shaft 150 which coacts with a nut 152 which is rigidly mounted with respect to support structure 119 as opposed to the cam assembly supporting bracket structure 131 which is free to move or slide lengthwise of support structure 119 depending upon the actuation of the threaded shaft 150. Thus adjustment of the shaft 150 adjusts the position of the cam assembly relative to the pivotal center of the pilot valve motion, thus adjusting the chute reversal position relative to the longitudinal axis of the conveyor belt. It will be seen that such adjusting of the center of the traversing path across the belt is adjustable even when the discharge chute is in motion.

The terms and expressions which have been utilized are terms of description and not of limitation and there is no intention in the use of such terms and expressions of excluding any equivalents of any of the features shown, or described, or portions thereof, and it is recognized that various modifications are possible within the scope of the invention claimed.

I claim:

1. In a pressure fluid control system for a reciprocal drive member coupled to an element for oscillating said element, a pilot valve interposed between a source of pressure fluid and the drive member for controlling the cyclic reciprocation of said drive member, a fluid pressure responsive control valve coupled to said drive member and to said pilot valve for supplying pressure fluid from said pilot valve alternately to one end and then to the other end of said drive member, means movably mounting said pilot valve, pilot valve control means comprising a valve member of said pilot valve mounted for oscillatory movement, said valve member having a pivotable exteriorly accessible lever effective to cause its oscillatory movement for reversing the flow of pressure fluid through said control valve, means for periodically actuating said lever including a coupling interconnecting said element and said pilot valve effective to move said pilot valve in response to and in timed relation with the oscillation of said element, and means disposed adjacent said lever and positioned for engagement with said lever so as to actuate said lever during movement of said pilot valve effective to cause the oscillation of said valve member.

2. In a pressure fluid control system as is defined in claim 1 and wherein the pilot valve is swingably mounted and said coupling interconnecting said element and said pilot valve is effective to swing said pilot valve in response to and in timed relation with the oscillation of said element.

3. In a pressure fluid control system as is defined in claim 1 and wherein the means disposed adjacent said lever comprises cam means which are adjustable relative to said lever so as to vary the stroke of the latter and consequent rate and magnitude of oscillation of said element.

4. In a pressure fluid control system as is defined in claim 3 and wherein the cam means are adjustable in the path of movement of said lever.

5. In a pressure fluid control system as is defined in claim 3 and wherein the cam means are disposed on each side of said pivotable lever and positioned to effect its actuation.

References Cited in the file of this patent

UNITED STATES PATENTS

| | | |
|---|---|---|
| 92,813 | Forrester | July 20, 1869 |
| 2,489,911 | Lifner | Nov. 29, 1949 |
| 2,693,619 | Goss | Nov. 9, 1954 |
| 2,746,096 | Baxter et al. | May 22, 1956 |
| 2,803,110 | Chittenden | Aug. 20, 1957 |
| 2,854,059 | Palmer | Sept. 30, 1958 |
| 2,887,955 | Owen | May 26, 1959 |